(12) United States Patent
Curtis et al.

(10) Patent No.: US 9,144,742 B1
(45) Date of Patent: Sep. 29, 2015

(54) SYSTEM AND METHOD FOR PREDICTING PAYER DORMANCY THROUGH THE USE OF A TEST BED ENVIRONMENT

(71) Applicant: KABAM, INC., San Francisco, CA (US)

(72) Inventors: Matthew Curtis, Novato, CA (US);
James Koh, Mountain View, CA (US);
Kellen Christopher Smalley, Pleasanton, CA (US); Michael C. Caldarone, Palo Alto, CA (US)

(73) Assignee: Kabam, Inc., San Francisco, CA (US)

( * ) Notice: Subject to any disclaimer, the term of this patent is extended or adjusted under 35 U.S.C. 154(b) by 147 days.

(21) Appl. No.: 14/072,662

(22) Filed: Nov. 5, 2013

(51) Int. Cl.
*A63F 9/24* (2006.01)
*A63F 13/00* (2014.01)
*G06F 17/00* (2006.01)
*G06F 19/00* (2011.01)
*A63F 13/30* (2014.01)

(52) U.S. Cl.
CPC ....................................... *A63F 13/12* (2013.01)

(58) Field of Classification Search
USPC ............ 463/1, 20, 22, 25, 31, 39; 705/10, 39, 705/41
See application file for complete search history.

(56) References Cited

U.S. PATENT DOCUMENTS

| | | | |
|---|---|---|---|
| 6,036,601 A | 3/2000 | Heckel | 463/42 |
| 7,730,073 B2 | 6/2010 | McKee et al. | 707/749 |
| 7,908,562 B2 | 3/2011 | McKee et al. | 715/764 |
| 8,182,346 B2 | 5/2012 | Herrmann et al. | 463/42 |
| 8,246,466 B2 | 8/2012 | Herrmann et al. | 463/42 |
| 8,260,657 B1 | 9/2012 | Conway | 705/7.35 |
| 8,423,892 B1 | 4/2013 | Marsland et al. | 715/706 |
| 2003/0177055 A1 | 9/2003 | Zimmerman, Jr. et al. | 705/10 |
| 2008/0188308 A1 | 8/2008 | Shepherd et al. | 463/39 |
| 2010/0161379 A1* | 6/2010 | Bene et al. | 705/10 |
| 2011/0166939 A1* | 7/2011 | Junkin et al. | 705/14.61 |
| 2012/0238362 A1 | 9/2012 | Janis et al. | 463/31 |
| 2012/0265595 A1 | 10/2012 | Corner et al. | 705/14.23 |
| 2012/0265599 A1 | 10/2012 | Corner et al. | 705/14.35 |
| 2012/0265602 A1 | 10/2012 | Corner et al. | 705/14.39 |
| 2012/0315987 A1 | 12/2012 | Walling | 463/31 |
| 2013/0006734 A1 | 1/2013 | Ocko et al. | 705/14.12 |

* cited by examiner

*Primary Examiner* — Adetokunbo O Torimiro
(74) *Attorney, Agent, or Firm* — Sheppard Mullin Richter & Hampton, LLP

(57) ABSTRACT

One aspect of the disclosure relates to predicting payer dormancy through the use of a test bed environment. The payer dormancy may be determined based on observance of purchases made by users in a test bed environment. The test bed environment may grant free virtual currency to players that can be spent in the isolated and controlled test environment. The spending of these virtual currencies by users on offers of virtual items for use in the test bed environment may then be used to predict payer dormancy in an online game in which users spend real money consideration to acquire virtual currency.

16 Claims, 7 Drawing Sheets

SYSTEM AND METHOD FOR PREDICTING PAYER DORMANCY THROUGH THE USE OF A TEST BED ENVIRONMENT

FIELD

The disclosure relates to predicting payer dormancy through the use of a test bed environment.

BACKGROUND

In various online games, players purchase virtual goods through a shop menu when they are engaged in game play. When a player stops making in game purchases, and stops interacting with the game, the player is no longer engaged. In some implementations, players may quit playing the game altogether or only minimally interact with the game.

SUMMARY

One aspect of the disclosure relates to predicting payer dormancy through the use of a test bed environment. The payer dormancy may be determined based on observance of purchases made by users in a test bed environment. The test bed environment may grant free virtual currency to players that can be spent in the isolated and controlled test environment. The spending of these virtual currencies by users on offers of virtual items for use in the test bed environment may then be used to predict payer dormancy in an online game in which users spend real money consideration to acquire virtual currency.

A system configured to predict payer dormancy through the use of a test bed environment which may include one or more processors configured to execute compute program modules. The program modules may comprise a game module, a user module, a network module, a game shop module, a test game module, a test shop module, a purchase history module, a spend prediction module, a calculation module, and/or any other modules.

The game module may be configured to execute an instance of an online game, and to implement the instance of the online game to facilitate participation of users in the online game, the users including a first user and/or any other user.

The game shop module may be configured to present offers to sell sets of one or more virtual items usable in the online game to the users in a game shop interface. The individual offers for the sets of one or more virtual items may have purchase prices in a virtual currency having a real money value. The offers may include a first offer to sell a first set of one or more items for a first purchase price and/or any other price.

The test game module may be configured to execute an instance of an online test game, and to implement the instance of the online test game to facilitate participation of users in the online test game and/or any other game.

The test shop module may be present offers to sell sets of one or more virtual items usable in the online test game to the users in a test shop interface. The individual offers for the sets of one or more virtual items may have purchase prices in a test currency and/or any other currency. The offers may include a second offer to sell the first set of one or more items for a second purchase price and/or any other price.

The purchase history module may be configured to obtain test purchase information that characterizes past purchases of the individual virtual items in the sets of one or more virtual items purchased through the test shop interface. The test purchase information may include purchase information that characterizes past purchases of the individual virtual items in the first set of one or more virtual items through the test shop interface and/or any other interface. The purchase history module may obtain test user context information characterizing user context at the times the past purchases and/or any other purchases were made. The purchase history module may be configured such that the user context information comprises one or more of: player level, amount of player virtual currency, player city, and player faction and/or any other game parameter and/or user metric.

Game parameters shall include, but not be limited to: completing all or part of a mission; playing for a certain period of time; winning a match against another player character or computer generated character; reaching a certain level or score; using or obtaining an ability or technology; kill/death ratios; obtaining, creating or modifying an object; solving a puzzle; accuracy with weapons; effective use of the proper weapon; killing a certain character/creature; getting through or to a certain geographic area; decreasing or increasing Karma Points; getting, buying, exchanging or learning a new skill or player attribute; having a child; getting married; obtaining, buying, trading, producing or developing raw materials; producing goods or services; earning income; earning a higher rank in an army; winning an election among two or more player characters; achieving deity or other status; improving player character status or caste; assisting other player characters with any of the above; speed of accomplishing or changing the rate or trends of any or all of the above.

The user metric may quantify one or more of a progress within the game, a power level within the game, a skill level within the game, a level of virtual technology advancement within the game, success within the game as a whole or within certain types of gameplay (e.g., player-versus-player gameplay, player-versus-environment gameplay, harvesting gameplay, and/or other gameplay types), and/or other aspects. A metric can be classified as a status metric or a predictive metric. A status metric characterizes behavioral information of a set of on-line entities where the behavioral information is related to at least one activity of the on-line entities within the persistent virtual environment. Example status metrics include, without limitation, a prominence metric, a centrality degree metric, a cohesive subgroup metric, a group level equivalence metric, a leadership metric, a strength of ties metric, an interactivity metric, a topic of interaction metric, a role metric, a social accounting metric, a game-play metric, a modeling metric, and an interaction topic metric as well as other metrics. These metrics are subsequently briefly described.

A predictive metric can, for example, evaluate the change in a status metric over time. Example predictive metrics include, without limitation: a churn metric, a compatibility metric, a scheduling metric, a content consumption metric, an environmental balance metric, a survival metric, and an economic metric. "Churn" metrics predict the probability of a player leaving the persistent virtual environment, based on the player's past interaction patterns. Compatibility metrics indicate whether or not a player's play style will match a proposed player association or whether the player's play style matches that of the player association to which he/she is a member. Scheduling metrics predict the probability of a player being available for a future joint activity, so that such activities can be planned in advance. Content consumption metrics predict when players will have exhausted the persistent virtual environment's resources, in order to plan timely expansions to the persistent virtual environment. Environmental balance metrics predict the effects of a design change on the persistent virtual environment, such as removing a given "profession" or certain items from the persistent virtual environment. Economic metrics predict inflation, trade volume, and other variables in order to maintain the balance of trade in the persistent virtual environment. The survival metric indicates the health of a player association.

The spend prediction module may be configured to determine a future spend prediction for the first user in the online game based on test purchase information of users of the online test game having test user context information that correlates to the user context information of the first user and/or any other user. The future spend prediction for the first user may be a predicted rate of spend by the first user and/or any other user. The future spend prediction may be a predicted amount of future spending by the first user and/or any other user. The future spend prediction may be a predicted amount of future game play for the first user and/or any other user.

The calculation module may be configured to adjust the purchase price of the first offer for the first user based on the future spend prediction for the first user and/or any other user. The calculation module may be configured to generate a notification for the first user related to a different online game based on the future spend prediction for the first user and/or any other user. The calculation module may be configured to generate in-game suggestions for the first user based on the future spend prediction for the first user and/or any other user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
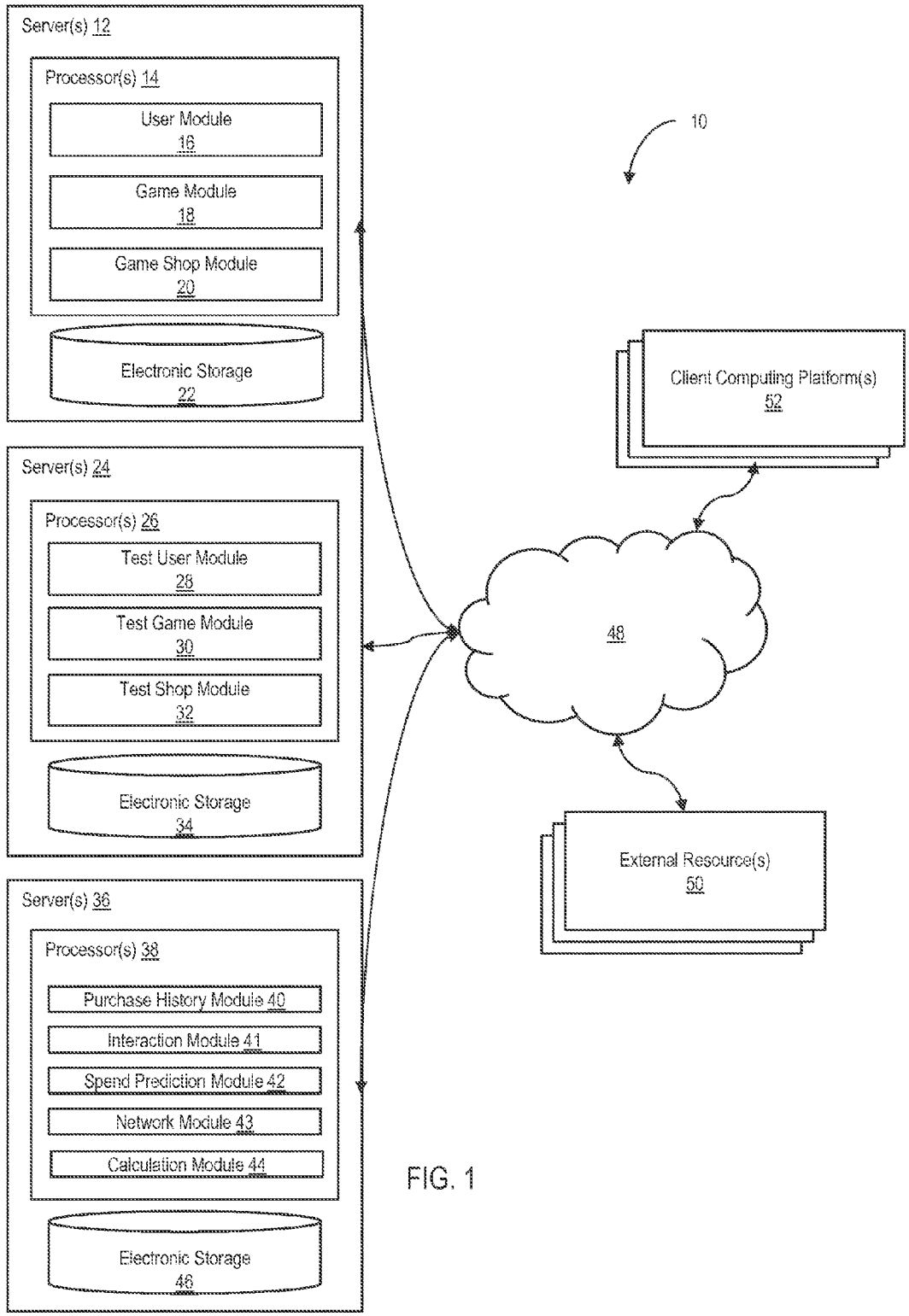
FIG. 1 illustrates an exemplary system configured to predicting payer dormancy through the use of a test bed environment, according to an aspect of the invention.

FIG. 1 illustrates an exemplary system 10 configured to determining offer placement in a virtual space store interface, according to an aspect of the invention.

In some implementations, system 10 may include a game server(s) 12, 24, 36. The game server(s) 12, 24, 36 may host a game space in which an online game takes place. The game server(s) 12, 24, 36 may be configured to communicate with one or more client computing platform(s) 52 according to a client/server architecture. The users may access system 10 and/or the virtual space via client computing platform(s) 52.

The game server(s) 12, 24, 36 may be configured to execute one or more computer program modules. The computer program modules may include one or more a user module 16, a game module 18, a game shop module 20, a test user module 28, a test game module 30, a test shop module 32, a purchase history module 40, an interaction module 43, a virtual item display module 42, a network module 43, a display priority module 44 and/or any other modules.

The system may comprise a user module 16 configured to store inventories of virtual items that are available to users in the game space. The inventories may include a first inventory and/or any other inventory of virtual items available to a first user in the game space.

The user module 16 may be configured to access and/or manage one or more user profiles and/or user information associated with users of the system 10. The one or more user profiles and/or user information may include information stored by game server(s) 12, 24, 36, one or more of the client computing platform(s) 52, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The user module 16 may be configured to store inventories of virtual items including resources that are available to users in the virtual space. Various matters may be collected in an inventory. These matters may include, but are not limited to, virtual items, virtual resources, character attributes, character skills, and/or virtual currency. A virtual item may be an item that can be used in a virtual world to assist a player's character. Examples of virtual items include, but are not limited to, valuables (e.g., money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, non-player characters (NPCs), building materials, potions, etc. A character attribute may be any quality, trait, feature and/or characteristic a particular character can have. Character attributes may include, but are not limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other player characters.

The user module 16 may maintain an inventory for the user's character. Virtual awards for the user may be collected in this inventory. The inventory may be accessed through an interface. As the character or other entity progresses through the game the character or other entity may receive access to higher-level items. Higher-level items may be more powerful and/or effective within the game. This may include having parameters (e.g., hit points, attack strength, defense points, speed, etc.) that enhance the functionality of the items in the game. The player may be able to review items within the player's inventory and equip the character and/or other entity with an item appropriate to the current game situation. Items may be dragged from the inventory to a preview window. As items are selected, they may appear either on or next to the character or entity. For example, if the character entity is currently not building and/or researching anything, a building may be built and/or research may be started by—accessing the character's inventory and utilizing virtual items. Management of a character's inventory is a common game mechanic, and may lead to many hours of game play. Players may collect, trade, buy, fight over items, and/or perform other actions to add to their inventory. Games in different genres, such as science fiction, may incorporate items specific to that genre. For example, laser guns may be substituted in place of swords as the standard weapon used by characters within a science fiction-type game. The data describing clothing and other equipment or gear may be stored in the character record.

Players within the game may acquire virtual currency. In such games, the virtual currency might be represented by virtual coins, virtual cash, or by a number or value stored by the server for that player's benefit. Such virtual currency may represent units of value for use as consideration in transactions in the online game system, and/or may be analogous to legal currency. Virtual currency can be purchased for real money consideration. Such purchases may be made for cash or credit denominated in real money, made be made for another virtual currency previously purchased by a player for real money (e.g., Facebook credits, Bitcoins, and/or other virtual currency). A player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

Virtual currency may be used to purchase one or more in-game assets or other benefits. For example, a player may be able to exchange virtual currency for a desired level, access, right, or item in an online game. In some implementations, legal currency can be used to directly purchase an in-game asset or other benefit. The player can select the desired in-game asset or other benefit. Once the necessary selections are made, the player can place the order to purchase the in-game asset or other benefit. This order is received by the game system, which can then process the order. If the order is processed successfully, an appropriate financial account associated with the player can be debited by the amount of virtual currency or legal currency needed to buy the selected in-game asset or other benefit.

Multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. Virtual cash may be awarded for leveling up in the game.

The game module 18 may be configured to execute a game instance of a game space. The game instance may be used to facilitate presentation of views of the game space to users. The game instance may be configured to facilitate interaction of the users with the game space and/or each other by performing operations in the game instance in response to commands and/or any other input received from the users.

The game module 18 may be configured to implement the instance of the virtual space executed by the computer modules to determine state of the virtual space. The state may then be communicated (e.g., via streaming visual data, via object/position data, and/or other state information) from server(s) 12, 24, 36, to client computing platform(s) 52 for presentation to users. The state determined and transmitted to a given client computing platform(s) 52 may correspond to a view for a user character being controlled by a user via the given client computing platform(s) 52. The state determined and transmitted to a given client computing platform(s) 52 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platform(s) 52) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by game module 18 is not intended to be limiting. The game module 18 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game module 18, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platform(s) 52. The users may interact with each other through communications exchanged within the virtual space. Such communications may include one or more of textual chat, instant messages, private messages, voice communications, and/or other communications. Communications may be received and entered by the users via their respective client computing platform(s) 52. Communications may be routed to and from the appropriate users through server(s) 12, 24, 36 (e.g., through game module 18).

The interaction module 41 may be configured to monitor interactions of the users with the virtual space and/or each other within the virtual space. This may include monitoring, for a given user, one or more of times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. Some or all of the information generated by interaction module 41 in monitoring the interactions of the users may be stored to the user profiles managed by user module 16.

At a given time, interaction module 41 may determine a set of users that are currently engaged with the virtual space and/or a set of users that are currently not engaged with the virtual space. Being engaged with the virtual space may refer to being logged in to the virtual space, performing some action or interaction within the virtual space within some period of time (e.g., the last 2 minutes), and/or other taking some other action indicating ongoing and contemporaneous engagement with the virtual space.

The interaction module 41 may be configured to determine, for individual users, an activity metric that indicates an activity level within the virtual space. The activity metric may be determined based on one or more of log in frequency, amount of time logged in to the virtual space within a rolling time period (e.g., over the last day, week, month, or other rolling time period), average amount of time logged in to the virtual space over some length of time (e.g., per day, per week, and/or other length of time), average log in session time over a rolling time period, number of inter-user communications over a length of time, number of inter-user communications per log in, number of relationships with other users in the virtual space, number of new relationships with other users in the virtual space within a rolling time period, amount of real world money spent in the virtual space, and/or other activity parameters.

Network module 43 of the game server(s) 12, 24, 36 may be configured to maintain a connection to the one or more client computing platform(s) 52. For example, the network module 43 may maintain one or more communication lines or ports to enable connection and/or exchange of information with a network 36 and/or other computing platform(s). Information such as state information, game state and game logic may be communicated via network module 43. The network module 43 may be configured to receive information from the client computing platform(s) 52 as well.

The game shop module 20 may be configured to present offers to sell sets of one or more virtual items usable in the online game to the users in a game shop interface. The individual offers for the sets of one or more virtual items may have purchase prices in a virtual currency having a real money value. The offers may include a first offer to sell a first set of one or more items for a first purchase price and/or any other price. A virtual item may be an item that can be used in the game instance by the user. For example, a virtual item may be used to assist a player's character, and/or in other ways. Examples of virtual items include, but are not limited to, resources, currency, valuables (e.g., money, valuable metals or gems, etc.), weapons, spell components, defense components, armor, mounts, pets, attire, power ups, and/or other items.

A test server 24 may be configured to communicate with one or more client computing platform(s) 52, according to client/server architecture. The client computing platform(s) 52 can include, for example, a personal computer (PC), gaming console (e.g., Xbox, Wii, etc.), mobile device, smartphone, laptop, or other device capable of presenting the virtual environment to the user. Thus, the users may access system 10 and/or the virtual environment (e.g., online test game) via client computing platform(s) 52.

The test game module 30 may be configured to execute an instance of an online test game, and to implement the instance of the online test game to facilitate participation of users in the online test game and/or any other game. The test game and the game may be the same and/or substantially the same.

The test game module 30 may be configured to implement the instance of the virtual environment executed by the computer modules of test server 24 to determine state of the virtual environment. The state may then be communicated (e.g., via streaming visual data, via object/position data, and/ or other state information) from test server 24 to client computing platform(s) 52 for presentation to users. The state determined and transmitted to a given client computing platform(s) 52 may correspond to a view for a user character being controlled by a user via the given client computing platform(s) 52. The state determined and transmitted to a given client computing platform(s) 52 may correspond to a location in the virtual environment (e.g., location in the test game). The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual environment may comprise a simulated environment that is accessible by users via clients (e.g., client computing platform(s) 52) that present the views of the virtual environment to a user. The simulated environment may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the environment, and/or surface features of a surface or objects that are "native" to the environment. In some instances, the topography may describe a surface (e.g., a ground surface) that runs through at least a substantial portion of the environment. In some instances, the topography may describe a volume with one or more bodies positioned therein (e.g., a simulation of gravity-deprived environment with one or more celestial bodies positioned therein). The instance executed by the computer modules may be synchronous, asynchronous, and/or semi-synchronous.

The above description of the manner in which state of the virtual environment is determined by test game module 30 is not intended to be limiting. The test game module 30 may be configured to express the virtual environment in a more limited, or more rich, manner. For example, views determined for the virtual environment representing the state of the instance of the virtual environment may be selected from a limited set of graphics depicting an event in a given place within the virtual environment. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual environment are contemplated.

Within the instance(s) of the virtual environment executed by test game module 30, users may control characters, objects, simulated physical phenomena (e.g., wind, rain, earthquakes, and/or other phenomena), and/or other elements within the virtual environment to interact with the virtual environment and/or each other. The user characters may include avatars. As used herein, the term "user character" may refer to an object (or group of objects) present in the virtual environment that represents an individual user. The user character may be controlled by the user with which it is associated. The user controlled element(s) may move through and interact with the virtual environment (e.g., non-user characters in the virtual environment, other objects in the virtual environment). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual environment.

The users may participate in the instance of the virtual environment by controlling one or more of the available user controlled elements in the virtual environment. Control may be exercised through control inputs and/or commands input by the users through client computing platform(s) 52. The users may interact with each other through communications exchanged within the virtual environment. Such communications may include one or more of textual chat, instant messages, private messages, voice communications, and/or other communications. Communications may be received and entered by the users via their respective client computing platforms 52. Communications may be routed to and from the appropriate users through server 24 (e.g., through test game module 30).

The test user module 28 may be configured to access and/or manage one or more test user profiles and/or test user information associated with users of the system 10. The one or more test user profiles and/or test user information may include information stored by test server 24, one or more of the client computing platform(s) 52, and/or other storage locations. The test user profiles may include, for example, information identifying users (e.g., a username or handle, a number, an identifier, and/or other identifying information) within the virtual environment, security login information (e.g., a login code or password), virtual environment account information, subscription information, test currency account information (e.g., related to test currency held in credit for a user), relationship information (e.g., information related to relationships between users in the virtual environment), virtual environment usage information, demographic information associated with users, interaction history among users in the virtual environment, information stated by users, browsing history of users, a client computing platform identification associated with a user, a phone number associated with a user, and/or other information related to users.

The test user module 28 may be configured to manage the user's "inventory" of virtual items and/or test currency that the users can use within the virtual environment (e.g., online test game). A user may have a test game "inventory" of one or more virtual items and/or test currency that the user can use (e.g., by manipulation of one or more user characters or other user controlled element, and/or other items) to perform in-game actions (e.g., facilitate purchase of virtual items) within the virtual environment. First test user information may include a first test inventory. First test user information and first test inventory may be associated with a second user. First test inventory may include the amount of test currency available for use by the second user within the test game provided by test server 24. The second user of the test game and the first user of the online game may be different users. The second user and the first user may be the same user.

Users of the online test game may acquire test currency as free promotional currency given to the users upon execution of the virtual environment (e.g., online test game). For example, upon execution of the online test game, the users test inventory including the amount of test currency available for user by the users of the test game may be given a certain amount test currency to allow the user to make purchases of virtual items and/or sets of one or more virtual items from the test shop interface. The amount of test currency provided to individual users may be considerably larger (e.g., 10 times, 100 times, and/or other multipliers) an amount of in-game virtual currency typically purchased by a user of the game.

The test shop module 32 may be present offers to sell sets of one or more virtual items usable in the online test game to the users in a test shop interface. The individual offers for the sets of one or more virtual items may have purchase prices in a test currency and/or any other currency. The offers may include a second offer to sell the first set of one or more items for a second purchase price and/or any other price.

Test shop module 32 executed by processor 26 may be configured to facilitate purchase interactions of the one or more users of the virtual environment (e.g., test game). Test shop module 32 may facilitate an instance of a virtual shop (e.g., test shop) to be presented within the virtual environment (e.g., online test game). The test shop may be a simulated environment within the virtual environment presented by test game module 32 which is accessible by users and presents the views of the test shop to the users. Users may access the test shop through one of a variety of ways. Users may access the test shop through the manipulation of one or more user characters associated with the user within the virtual environment using control inputs and/or commands input by the users through client computing platform(s) 52. Users may access the test shop through control inputs and/or commands input by the users through client computing platform(s) 52 which automatically presents the instance of the test shop to the client computing platform(s) 52, and/or other way of access.

Manipulation of a character may include moving the one or more user characters through the virtual environment using control inputs and/or commands input by the users through client computing platform(s) 52, to move the one or more characters to the simulated environment designating the location of the test shop within the virtual environment.

Users may use control inputs and/or commands not associated with the one or more user characters to access the test shop. Control inputs and/or commands may automatically present the instance of the test shop on the client computing platform(s) 52 (e.g., user selects a test shop button to automatically be taken to the test shop).

The instance of the test shop may be presented to users through test shop interface. The test shop interface may be configured to present offers of sets of one or more virtual items to users. The test shop interface may be configured to receive entry and/or selection of individual offers by the users to effectuate acceptance and/or purchase of the offers. Test shop interface may include the first set of one or more virtual items available for purchase by users of the virtual space (e.g., online game), and/or other virtual items and/or sets. The sets of one or more virtual items may be offered for purchase to users at a purchase price of test currency. For example, a first offer for sale of the first set in test shop interface may be at a second purchase price of test currency.

The second purchase price of test currency for the first set through test shop interface may be the same as the first purchase price of virtual currency for the first set through game shop interface. The second purchase price of test currency for the first set through test shop interface may be the higher than the first purchase price of virtual currency for the first set through game shop interface. The second purchase price of test currency for the first set through test shop interface may be lower than the first purchase price of virtual currency for the first set through game shop interface.

The simulated environment of the test shop may have topography. The test shop may express ongoing real-time interaction by one or more users (e.g., may have limited stock of virtual items for sale which can be purchased by one or more users within the virtual environment which can be depleted), and/or include one or more objects (e.g., one or more virtual items, a virtual teller, and/or other objects) positioned within the topography that may be capable of locomotion within the topography. The test shop may display the one or more virtual items, and/or the one or more sets of one or more virtual items available for purchase by the users. Users may view the one or more virtual items and/or one or more sets available for purchase. Users may purchase one or more virtual items and/or one or more sets using test currency, and/or other consideration. Transactions may take place with the virtual teller, through various other actions of the user within the instance of the test shop, and/or other transaction mechanisms.

The purchase history module 40 may be configured to obtain test purchase information that characterizes past purchases of the individual virtual items in the sets of one or more virtual items purchased through the test shop interface. The test purchase information may include purchase information that characterizes past purchases of the individual virtual items in the first set of one or more virtual items through the test shop interface and/or any other interface. The purchase history module may obtain test user context information characterizing user context at the times the past purchases and/or any other purchases were made. The purchase history module may be configured such that the user context information comprises one or more of: player level, amount of player virtual currency, player city, and player faction and/or any other game parameter and/or user metric.

Game parameters shall include, but not be limited to: completing all or part of a mission; playing for a certain period of time; winning a match against another player character or computer generated character; reaching a certain level or score; using or obtaining an ability or technology; kill/death ratios; obtaining, creating or modifying an object; solving a puzzle; accuracy with weapons; effective use of the proper weapon; killing a certain character/creature; getting through or to a certain geographic area; decreasing or increasing Karma Points; getting, buying, exchanging or learning a new skill or player attribute; having a child; getting married; obtaining, buying, trading, producing or developing raw materials; producing goods or services; earning income; earning a higher rank in an army; winning an election among two or more player characters; achieving deity or other status; improving player character status or caste; assisting other player characters with any of the above; speed of accomplishing or changing the rate or trends of any or all of the above.

In some implementations, test servers are setup that users may join. In these test servers a test virtual currency (e.g., shadow gems) and/or any other user metric may be monitored and/or granted at difference cadence and different amount to the users of that test server. In some implementations, the test virtual currency and/or any other user metric may be used only on these test servers and not on a live server involving real currency transaction. By tracking a user's test virtual currency spending and/or any other user metric behavior, the position of certain virtual items may be moved to a more prominent position, a less prominent position, and may even be excluded in the shop menu. As a result a shop menu will present an organized list of virtual items for a user to view and decide on what he/she should invest their virtual currency in.

In some implementations, an operator may analyze the user's test virtual currency spending behavior and/or any other user metric. In some implementations, the user's test virtual currency spending behavior and/or any other user metric may be automatically tracked.

In some implementations, user context information may quantify and/or characterize one or more of a progress within the game, a power level within the game, a skill level within the game, a level of virtual technology advancement within the game, success within the game as a whole or within certain types of gameplay (e.g., player-versus-player gameplay, player-versus-environment gameplay, harvesting gameplay, and/or other gameplay types), and/or other aspects. User context information may include a status metric, a predictive metric, and/or other metrics. A status metric characterizes behavioral information of a set of on-line entities where the behavioral information is related to at least one activity of the on-line entities within the persistent virtual environment. Example status metrics include, without limitation, a prominence metric, a centrality degree metric, a cohesive subgroup metric, a group level equivalence metric, a leadership metric, a strength of ties metric, an interactivity metric, a topic of interaction metric, a role metric, a social accounting metric, a game-play metric, a modeling metric, and an interaction topic metric as well as other metrics. These metrics are subsequently briefly described.

A predictive metric can, for example, evaluate the change in a status metric over time. Example predictive metrics include, without limitation: a churn metric, a compatibility metric, a scheduling metric, a content consumption metric, an environmental balance metric, a survival metric, and an economic metric. "Churn" metrics predict the probability of a player leaving the persistent virtual environment, based on the player's past interaction patterns. Compatibility metrics indicate whether or not a player's play style will match a proposed player association or whether the player's play style matches that of the player association to which he/she is a member. Scheduling metrics predict the probability of a player being available for a future joint activity, so that such activities can be planned in advance. Content consumption metrics predict when players will have exhausted the persistent virtual environment's resources, in order to plan timely expansions to the persistent virtual environment. Environmental balance metrics predict the effects of a design change on the persistent virtual environment, such as removing a given "profession" or certain items from the persistent virtual environment. Economic metrics predict inflation, trade volume, and other variables in order to maintain the balance of trade in the persistent virtual environment. The survival metric indicates the health of a player association.

The predictive metrics can include those that develop a time-series of single or combinations of status metrics (weighted or un-weighted) that represent trends; metrics that represent heuristically determined conditions relevant to the predicted health of the persistent virtual environment; metrics based on a vector of attributes representing characteristics of the on-line entity such that the vectors can be used to classify on-line entities and to determine the characteristics of successful on-line entities; and to determine whether on-line entities have characteristics that are progressing toward or away from the characteristics of successful online entities.

The classification of the on-line entities can utilize a Bayesian network, spectral analysis, nearest neighbor techniques or any other classification mechanism. The predictive metrics can timely measure the social aspects of player interactions in the persistent virtual environment, and measure and/or monitor the health of the online player community in a persistent virtual environment. By using the predictive metrics, the MMOG provider can alter the persistent virtual environment to encourage desired social interactions and to discourage less desired social interactions.

The spend prediction module 42 may be configured to determine a future spend prediction for the first user in the online game based on test purchase information of users of the online test game having test user context information that correlates to the user context information of the first user and/or any other user. The future spend prediction for the first user may be a predicted rate of spend by the first user and/or any other user. The rate may be based on any game parameter and/or any predictive metric. The future spend prediction may be a predicted amount of future spending by the first user and/or any other user. The predicted amount of future spending may be based on any game parameter and/or any predictive metric. The future spend prediction may be a predicted amount of future game play for the first user and/or any other user. The predicted amount of future game play may be based on any game parameter and/or any predictive metric.

The calculation module 44 may be configured to adjust the purchase price of the first offer for the first user based on the future spend prediction for the first user and/or any other user. The calculation module may be configured to generate a notification for the first user related to a different online game based on the future spend prediction for the first user and/or any other user. The calculation module may be configured to generate in-game suggestions for the first user based on the future spend prediction for the first user and/or any other user. In-game suggestions may include suggesting the player participate in any in in-game task and/or modify any game parameter. Tasks shall include, but not be limited to: completing all or part of a mission; playing for a certain period of time; winning a match against another player character or computer generated character; reaching a certain level or score; using or obtaining an ability or technology; kill/death ratios; obtaining, creating or modifying an object; solving a puzzle; accuracy with weapons; effective use of the proper weapon; killing a certain character/creature; getting through or to a certain geographic area; decreasing or increasing Karma Points; getting, buying, exchanging or learning a new skill or player attribute; having a child; getting married; obtaining, buying, trading, producing or developing raw materials; producing goods or services; earning income; earning a higher rank in an army; winning an election among two or more player characters; achieving deity or other status; improving player character status or caste; assisting other player characters with any of the above; speed of accomplishing or changing the rate or trends of any or all of the above.

The game server(s) 12, 24, 36, client computing platform(s) 52, and/or external resource(s) 54 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game server(s) 12, 24, 36, client computing platform(s) 52, and/or external resource(s) 54 may be operatively linked via some other communication media.

Game server(s) 12, 24, 36 may include electronic storage 22, 34, 46, one or more processors 16, and/or other components. Game server(s) 12, 24, 36 may include communication lines, or ports to enable the exchange of information with a network 46 and/or other computing platform(s) 52. Illustration of game server(s) 12, 24, 36 in FIG. 1 is not intended to be limiting. Game server(s) 12, 24, 36 may include a plurality of hardware, software, and/or firmware components operating together to provide the functionality attributed herein to game server(s) 12, 24, 36. For example, game server(s) 12, 24, 36 may be implemented by a cloud of computing platforms operating together as game server(s) 12, 24, 36.

Electronic storage 22, 34, 46 may comprise non-transitory storage media that electronically stores information. The electronic storage media of electronic storage 22, 34, 46 may include one or both of system storage that is provided integrally (i.e., substantially non-removable) with game server(s) 12, 24, 36 and/or removable storage that is removably connectable to game server(s) 12, 24, 36 via, for example, a port (e.g., a USB port, a firewire port, etc.) or a drive (e.g., a disk drive, etc.). Electronic storage 22, 34, 46, may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 22, 34, 46, may include one or more virtual storage resources (e.g., cloud storage, a virtual private network, and/or other virtual storage resources). Electronic storage 22, 34, 46, may store software algorithms, information determined by processor(s) 14, 26, 38, information received from game server(s) 12, 24, 36, information received from client computing platform(s) 52, and/or other information that enables game server(s) 12, 24, 36 to function as described herein.

Processor(s) 14, 26, 38 is configured to provide information processing capabilities in game server(s) 12, 24, 36. As such, processor(s) 14, 26, 38, may include one or more of a digital processor, an analog processor, a digital circuit designed to process information, an analog circuit designed to process information, a state machine, and/or other mechanisms for electronically processing information. Although processor(s) 14, 26, 38, is shown in FIG. 1 as a single entity, this is for illustrative purposes only. In some implementations, processor(s) 14, 26, 38, may include a plurality of processing units. These processing units may be physically located within the same device, or processor(s) 16 may represent processing functionality of a plurality of devices operating in coordination. The processor(s) 14, 26, 38, may be configured to execute modules 16, 18, 20, 28, 30, 32, 40, 41, 42, 43, and/or 44. Processor(s) 14, 26, 38, may be configured to execute modules 16, 18, 20, 28, 30, 32, 40, 41, 42, 43, and/or 44 by software; hardware; firmware; some combination of software, hardware, and/or firmware; and/or other mechanisms for configuring processing capabilities on processor(s) 14, 26, 38. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 16, 18, 20, 28, 30, 32, 40, 41, 42, 43, and/or 44 are illustrated in FIG. 1 as being implemented within a single processing unit, in implementations in which processor includes multiple processing units, one or more of modules 16, 18, 20, 28, 30, 32, 40, 41, 42, 43, and/or 44 may be implemented remotely from the other modules. The description of the functionality provided by the different modules 16, 18, 20, 28, 30, 32, 40, 41, 42, 43, and/or 44 described below is for illustrative purposes, and is not intended to be limiting, as any of modules 16, 18, 20, 28, 30, 32, 40, 41, 42, 43, and/or 44 may provide more or less functionality than is described. For example, one or more of modules 16, 18, 20, 28, 30, 32, 40, 41, 42, 43, and/or 44 may be eliminated, and some or all of its functionality may be provided by other ones of modules 16, 18, 20, 28, 30, 32, 40, 41, 42, 43, and/or 44. As another example, processor 16 may be configured to execute one or more additional modules that may perform some or all of the functionality attributed below to one of modules 16, 18, 20, 28, 30, 32, 40, 41, 42, 43, and/or 44.

A given client computing platform(s) 52 may include one or more processors configured to execute computer program modules. The computer program modules may be configured to enable an expert or user associated with the given client computing platform(s) 52 to interface with system 10, game server(s) 12, 24, 36, and/or external resource(s) 50, and/or provide other functionality attributed herein to client computing platform(s) 52. By way of non-limiting example, the given client computing platform(s) 52 may include one or more of a desktop computer, a laptop computer, a handheld computer, a tablet computing platform, a NetBook, a Smartphone, a gaming console, and/or other computing platforms.

External resource(s) 50 may include sources of information, hosts and/or providers of virtual spaces outside of system 10, external entities participating with system 10, and/or other resources. In some implementations, some or all of the functionality attributed herein to external resource(s) 50 may be provided by resources included in system 10.

Figure 2:
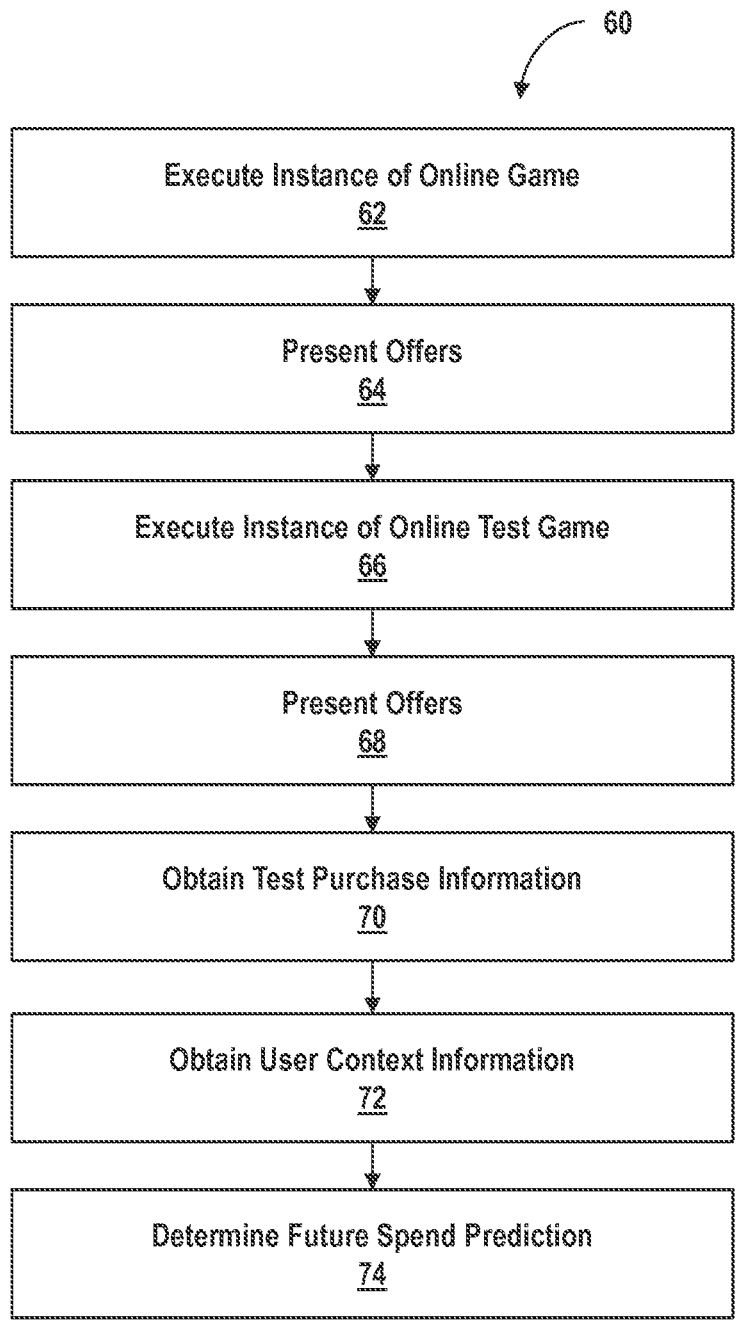
FIG. 2 illustrates an exemplary method of predicting payer dormancy through the use of a test bed environment, according to an aspect of the invention.

FIG. 2 illustrates an exemplary method 60 of determining offer placement in a virtual space store interface, according to an aspect of the invention. The operations of method 60 presented below are intended to be illustrative. In some embodiments, method 60 may be accomplished with one or more additional operations not described, and/or without one or more of the operations discussed. Additionally, the order in which the operations of method 60 are illustrated in FIG. 2 and described below is not intended to be limiting.

In some embodiments, method 60 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 60 in response to instructions stored electronically on an electronic storage medium. The one or more processing devices may include one or more devices configured through hardware, firmware, and/or software to be specifically designed for execution of one or more of the operations of method 60.

At an operation 62, an instance of a virtual space may be executed. In some implementations, operation 62 may be performed by a game module the same as or similar to game module 18 (shown in FIG. 1 and described above).

At an operation 64, the executed instance of the virtual space may be implemented to present offers. The offers to sell sets of one or more virtual items may be presented in the online game to the users in a game shop interface. In some implementations, operation 64 may be performed by a game shop module the same as or similar to game shop module 20 (shown in FIG. 1 and described above).

At an operation 66, an instance of an online test game may be executed. In some implementations, operation 66 may be performed by a test game module the same as or similar to the test game module 30 (shown in FIG. 1 and described above).

At an operation 68, the executed instance of the test game may be implemented to present offers. In some implementations, operation 68 may be performed by a test shop module the same as or similar to test shop module 32 (shown in FIG. 1 and described above).

At an operation 70, test purchase information may be obtained. In some implementations, operation 70 may be performed by a purchase history module the same as or similar to purchase history module 40 (shown in FIG. 1 and described above).

At an operation 72, user context information may be obtained. In some implementations, operation 72 may be performed by a purchase history module the same as or similar to purchase history module 40 (shown in FIG. 1 and described above).

At an operation 74, the future spend of a player may be determined. In some implementations, operation 74 may be performed by a spend prediction module the same as or similar to spend prediction module 42 (shown in FIG. 1 and described above).

Figure 3:
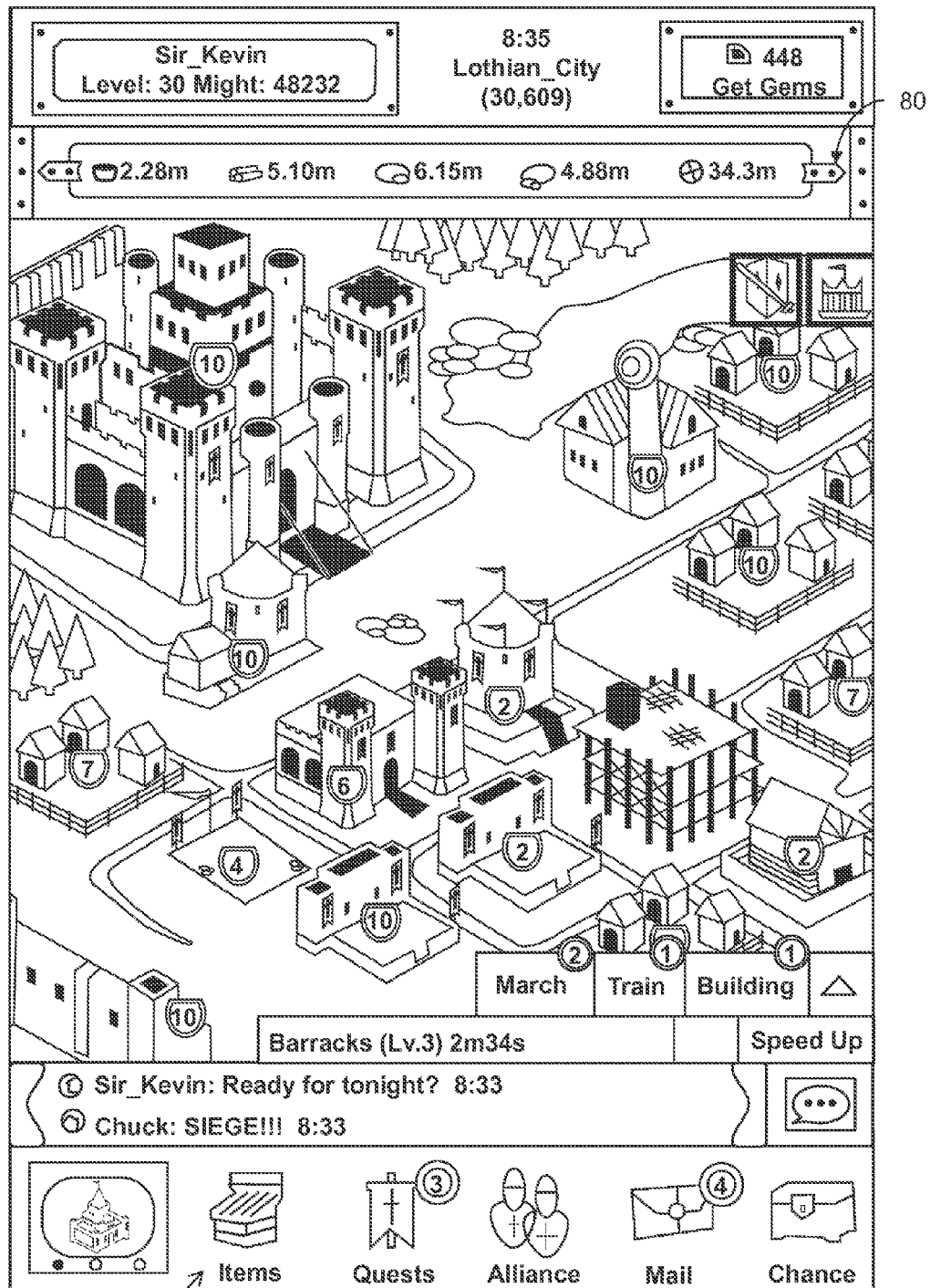
FIG. 3 illustrates an exemplary diagram of a user interface which implements system configured to predicting payer dormancy through the use of a test bed environment, according to an aspect of the invention.

FIG. 3 illustrates an exemplary diagram of a user interface 80 which determines offer placement in a virtual space store interface, according to an aspect of the invention. As shown, user interface 80 enables a user to view a list of virtual items available for purchase by selecting the items 82 tab.

Figure 4:
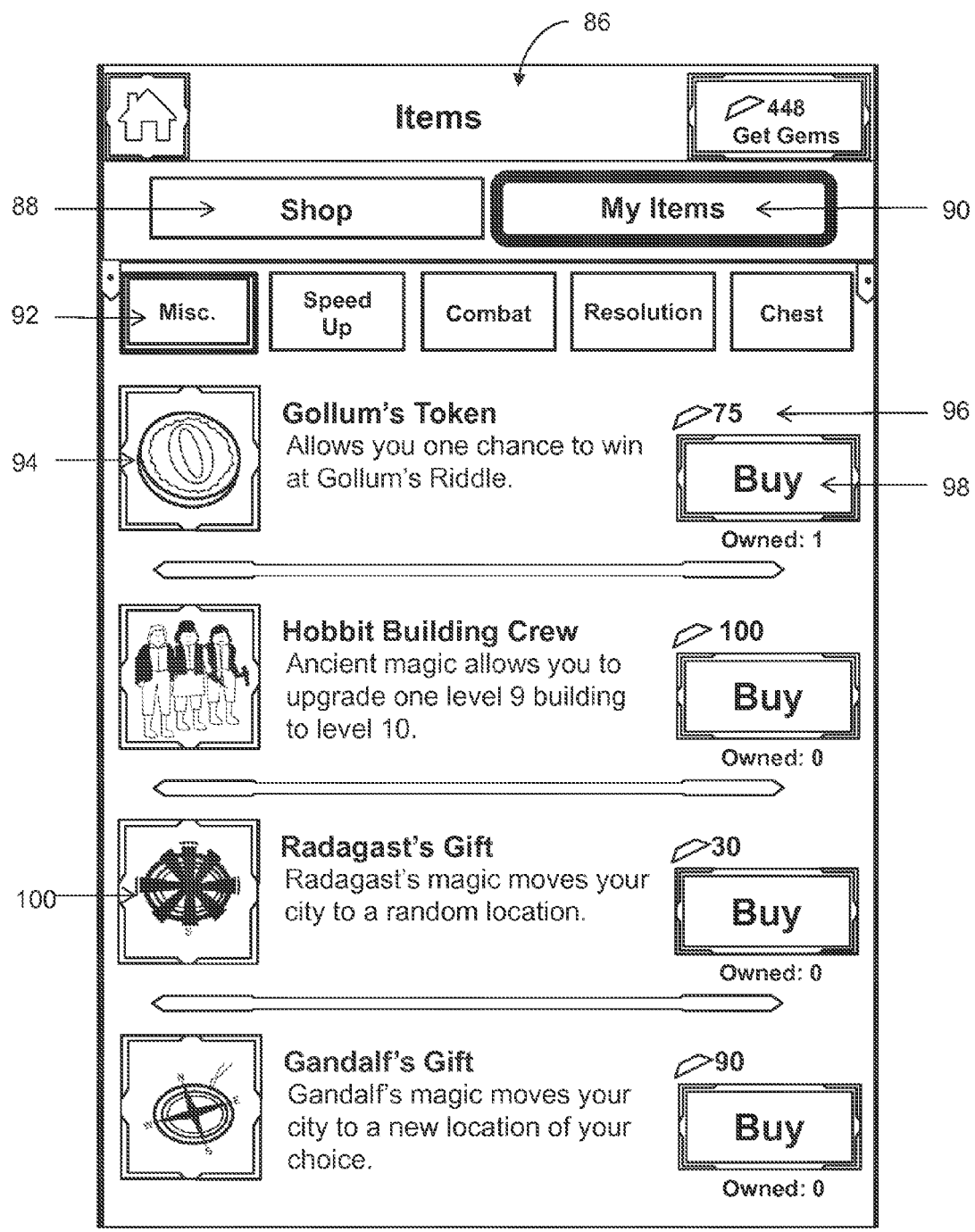
FIG. 4 illustrates an exemplary diagram of a user interface which implements system configured to predicting payer dormancy through the use of a test bed environment, according to an aspect of the invention.

FIG. 4 illustrates an exemplary diagram of a user interface 86 which determines offer placement in a virtual space store interface, according to an aspect of the invention. As shown, user interface 86 enables a user to purchase virtual items for in-game use. In some implementations, the user may select the shop tab 88 and/or the my items tab 90, and select from a category 92 of virtual in-game goods to purchase. In some implementations, the categories may include one or more: miscellaneous, speed up, combat, resources, chest, and/or any other category. Each category may contain lists of items 94, 100, for a user to purchase. The user interface 86 displays the cost 96 of each item to the user, and allows purchase of the item 98. For each user, the cost 96 or each item may differ based on user metrics. For each user, a different set of items 94, 100, may be available for purchase based on user metrics and/or user spending of test virtual currency and/or any other parameters.

Figure 5:
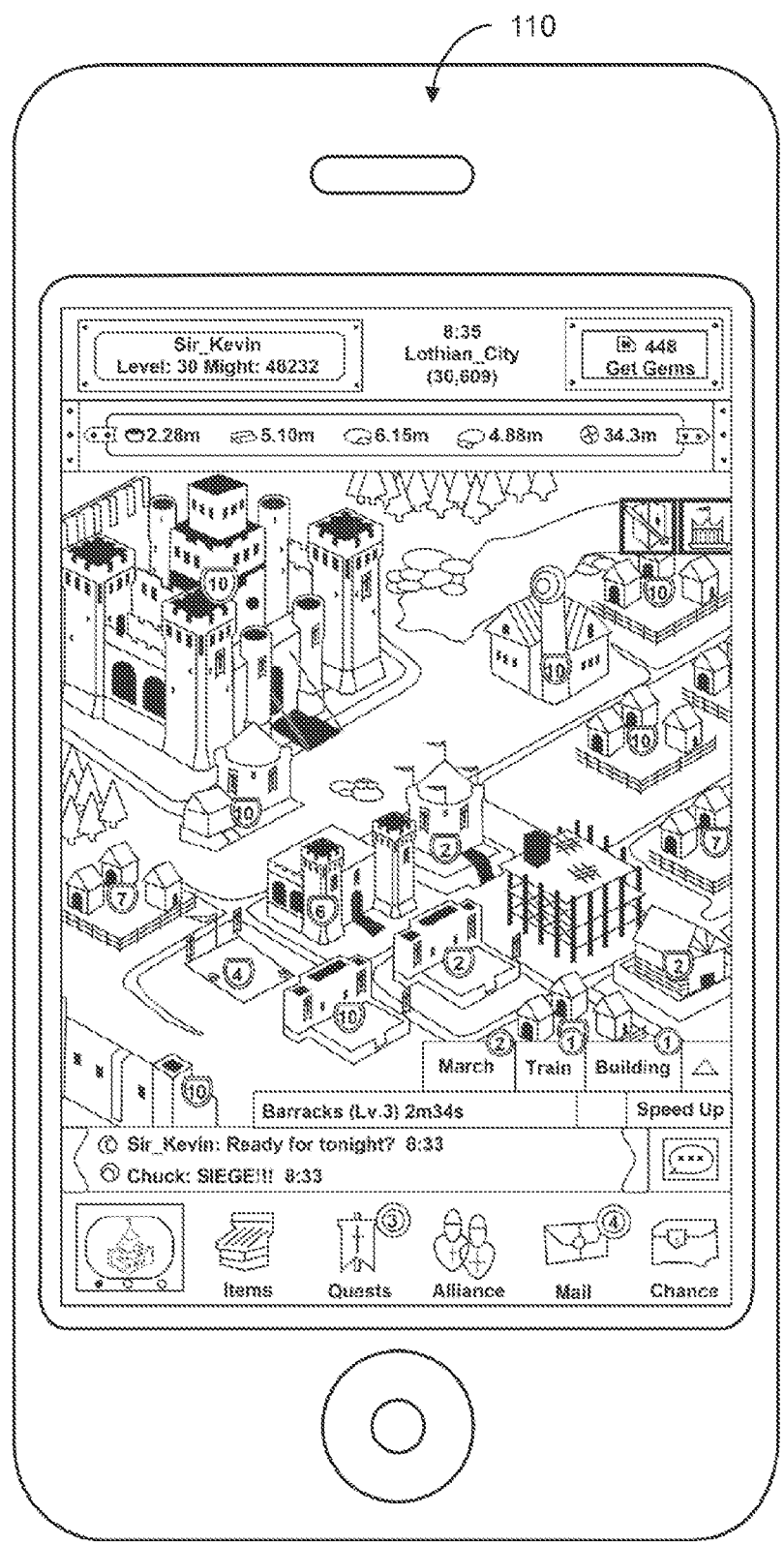
FIG. 5 illustrates an exemplary diagram of a user interface which implements system configured to predicting payer dormancy through the use of a test bed environment, according to an aspect of the invention.

FIG. 5 illustrates an exemplary diagram of a user interface 110, which determines offer placement in a virtual space store interface, according to an aspect of the invention. There may be several platforms in which the game may be implemented. Some platforms may include hardware platforms, operating system platforms and/or software platforms. In some implementations, hardware platform may include different types of systems in general (e.g., mainframe, workstation, desktop, handheld and/or embedded) and/or the specific type of processor (e.g., x86, SPARC, PowerPC and/or Alpha).

Figure 6:
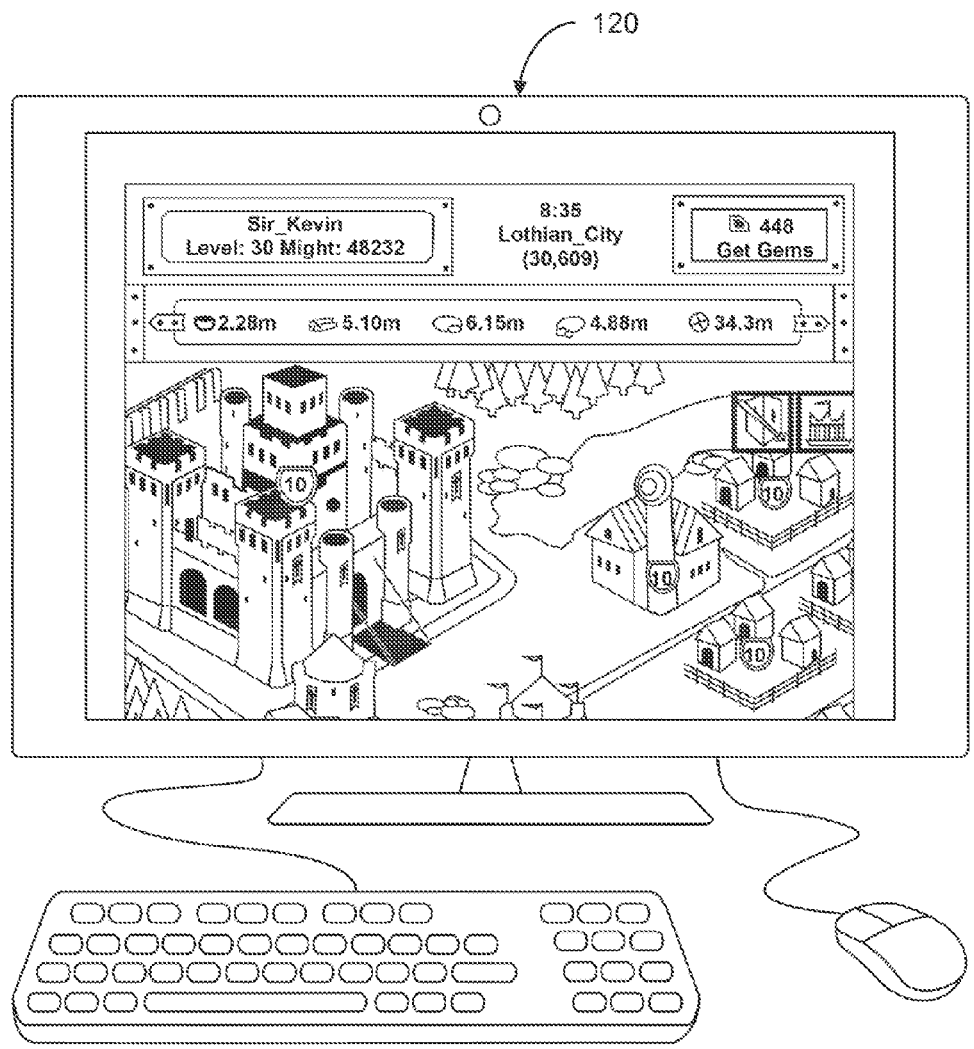
FIG. 6 illustrates an exemplary diagram of a user interface which implements system configured to predicting payer dormancy through the use of a test bed environment, according to an aspect of the invention.

FIG. 6 illustrates an exemplary diagram of a user interface 120 which determines offer placement in a virtual space store interface, according to an aspect of the invention.

Figure 7:
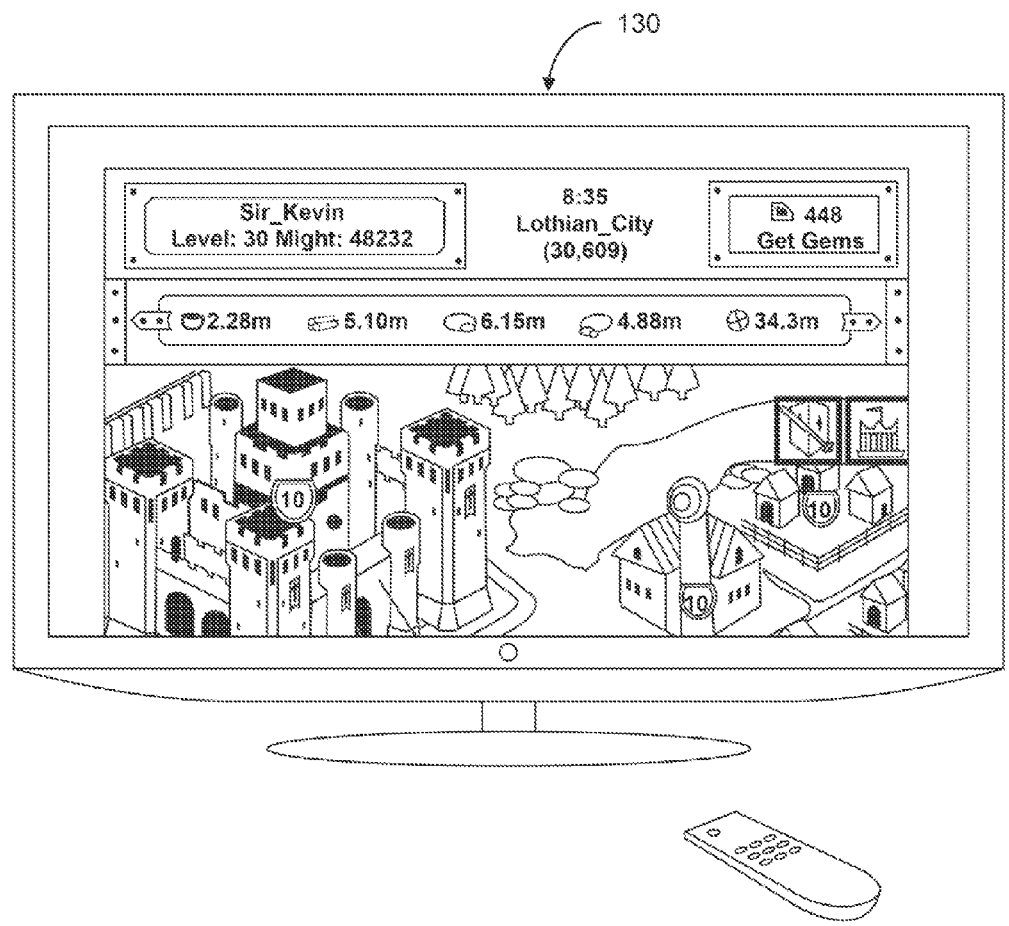
FIG. 7 illustrates an exemplary diagram of a user interface which implements system configured to predicting payer dormancy through the use of a test bed environment, according to an aspect of the invention.

FIG. 7 illustrates an exemplary diagram of a user interface 130 which determines offer placement in a virtual space store interface, according to an aspect of the invention.

It would be understood by one of ordinary skill in the art that the user interfaces may not be limited to the embodiment illustrated in FIGS. 3-7. The user interfaces may be associated with any objective, activity, action, or a combination thereof.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for predicting payer dormancy, the system comprising:
one or more processors configured to execute computer program modules, the computer program modules comprising:
a game module configured to execute an instance of an online game, and to implement the instance of the online game to facilitate participation of users in the online game, the users including a first user;
a game shop module configured to present offers to sell sets of one or more virtual items usable in the online game to the users in a game shop interface, the individual offers for the sets of one or more virtual items having purchase prices in a virtual currency having a real money value, the offers including a first offer to sell a first set of one or more items for a first purchase price;
a test game module configured to execute an instance of an online test game, and to implement the instance of the online test game to facilitate participation of users in the online test game;
a test shop module configured to present offers to sell sets of one or more virtual items usable in the online test game to the users in a test shop interface, the individual offers for the sets of one or more virtual items having purchase prices in a test currency, the offers including a second offer to sell the first set of one or more items for a second purchase price;
a purchase history module configured to:
obtain test purchase information that characterizes past purchases of the individual virtual items in the sets of one or more virtual items purchased through the test shop interface, the test purchase information including purchase information that characterizes past purchases of the individual virtual items in the first set of one or more virtual items through the test shop interface; and
obtain test user context information characterizing user context at the times the past purchases were made; and
a spend prediction module configured to determine a future spend prediction for the first user in the online game based on test purchase information of users of the online test game having test user context information that correlates to the user context information of the first user.

2. The system of claim 1, further comprising a calculation module configured to adjust the purchase price of the first offer for the first user based on the future spend prediction for the first user.

3. The system of claim 1, further comprising a calculation module configured to generate a notification for the first user related to a different online game based on the future spend prediction for the first user.

4. The system of claim 1, further comprising a calculation module configured to generate in-game suggestions for the first user based on the future spend prediction for the first user.

5. The system of claim 1, wherein the purchase history module is configured such that the user context information comprises one or more of: player level, amount of player virtual currency, player city, and player faction.

6. The system of claim 1, wherein the future spend prediction for the first user is a predicted rate of spend by the first user.

7. The system of claim 1, wherein the future spend prediction is a predicted amount of future spending by the first user.

8. The system of claim 1, wherein the future spend prediction is a predicted amount of future game play for the first user.

9. A computer implemented method for predicting payer dormancy, the method being implemented in a computer system that includes one or more physical processors executing computer program modules, the method comprising:

executing an instance of an online game, and implementing the instance of the online game to facilitate participation of users in the online game;

presenting offers to sell sets of one or more virtual items usable in the online game to the users in a game shop interface, the individual offers for the sets of one or more virtual items having purchase prices in a virtual currency having a real money value, the offers including a first offer to sell a first set of one or more items for a first purchase price;

executing an instance of an online test game, and to implement the instance of the online test game to facilitate participation of users in the online test game;

presenting offers to sell sets of one or more virtual items usable in the online test game to the users in a test shop interface, the individual offers for the sets of one or more virtual items having purchase prices in a test currency, the offers including a second offer to sell the first set of one or more items for a second purchase price;

obtaining test purchase information that characterizes past purchases of the individual virtual items in the sets of one or more virtual items purchased through the test shop interface, the test purchase information including purchase information that characterizes past purchases of the individual virtual items in the first set of one or more virtual items through the test shop interface;

obtaining test user context information characterizing user context at the times the past purchases were made; and determining a future spend prediction for the first user in the online game based on test purchase information of users of the online test game having test user context information that correlates to the user context information of the first user.

10. The method of claim 9, further configured to adjust the purchase price of the first offer for the first user based on the future spend prediction for the first user.

11. The method of claim 9, further configured to generate a notification for the first user related to a different online game based on the future spend prediction for the first user.

12. The method of claim 9, further configured to generate in-game suggestions for the first user based on the future spend prediction for the first user.

13. The method of claim 9, wherein the user context information comprises one or more of: player level, amount of player virtual currency, player city, and player faction.

14. The method of claim 9, wherein the first user is a predicted rate of spend by the first user.

15. The method of claim 9, wherein the future spend prediction is a predicted amount of future spending by the first user.

16. The method of claim 9, wherein the future spend prediction is a predicted amount of future game play for the first user.

* * * * *